(No Model.)  7 Sheets—Sheet 1.

J. H. SWIFT.
BOX NAILING MACHINE.

No. 289,941.  Patented Dec. 11, 1883.

Witnesses:
Henry F. Parker.
J. C. Lathrop.

Inventor:
Joseph H. Swift,
J. C. Woodward,
Attorney.

(No Model.) 7 Sheets—Sheet 2.

J. H. SWIFT.
BOX NAILING MACHINE.

No. 289,941. Patented Dec. 11, 1883.

Witnesses:
Henry F. Parker
J. C. Lathrop

Inventor:
Joseph H. Swift,
F. C. Woodward,
Attorney.

(No Model.) 7 Sheets—Sheet 3.
J. H. SWIFT.
BOX NAILING MACHINE.
No. 289,941. Patented Dec. 11, 1883.
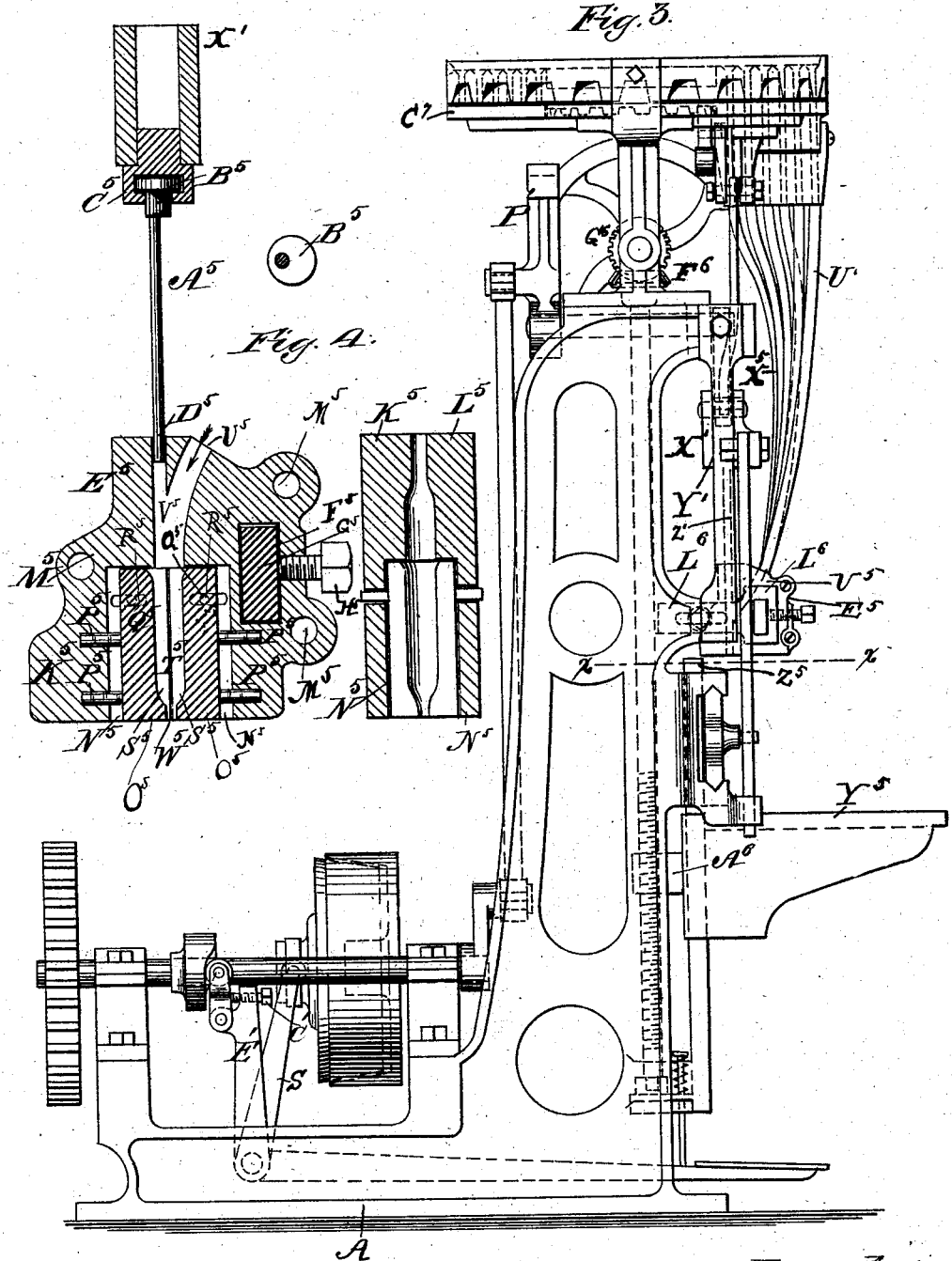

(No Model.)  7 Sheets—Sheet 4.
J. H. SWIFT.
BOX NAILING MACHINE.
No. 289,941.  Patented Dec. 11, 1883.
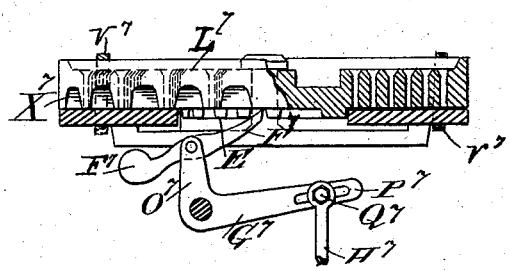
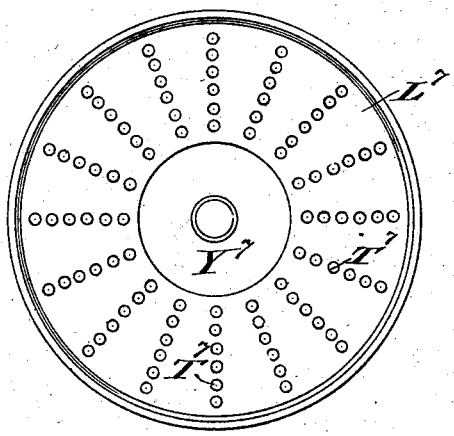
Fig. 6.
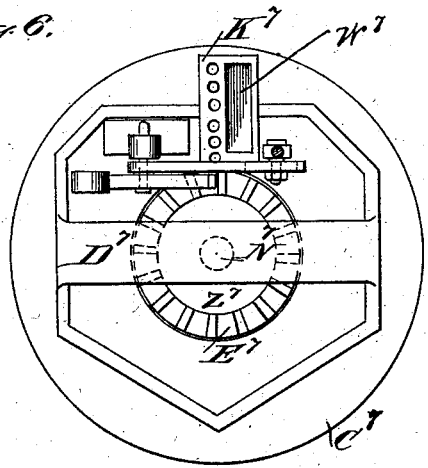
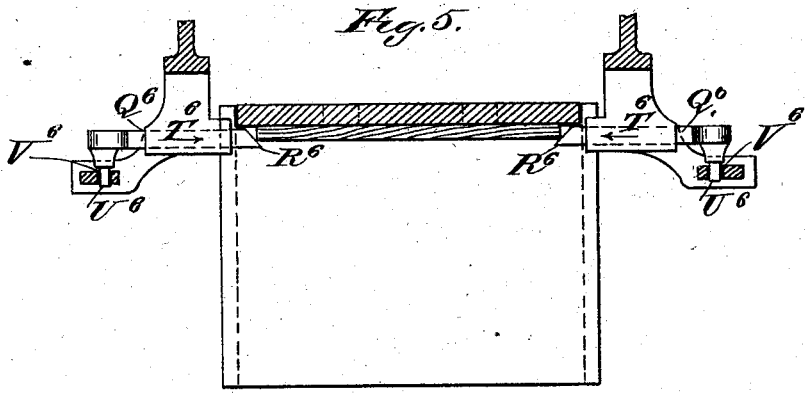
Fig. 5.
Witnesses:  Inventor:

(No Model.) 7 Sheets—Sheet 5.
J. H. SWIFT.
BOX NAILING MACHINE.
No. 289,941. Patented Dec. 11, 1883.
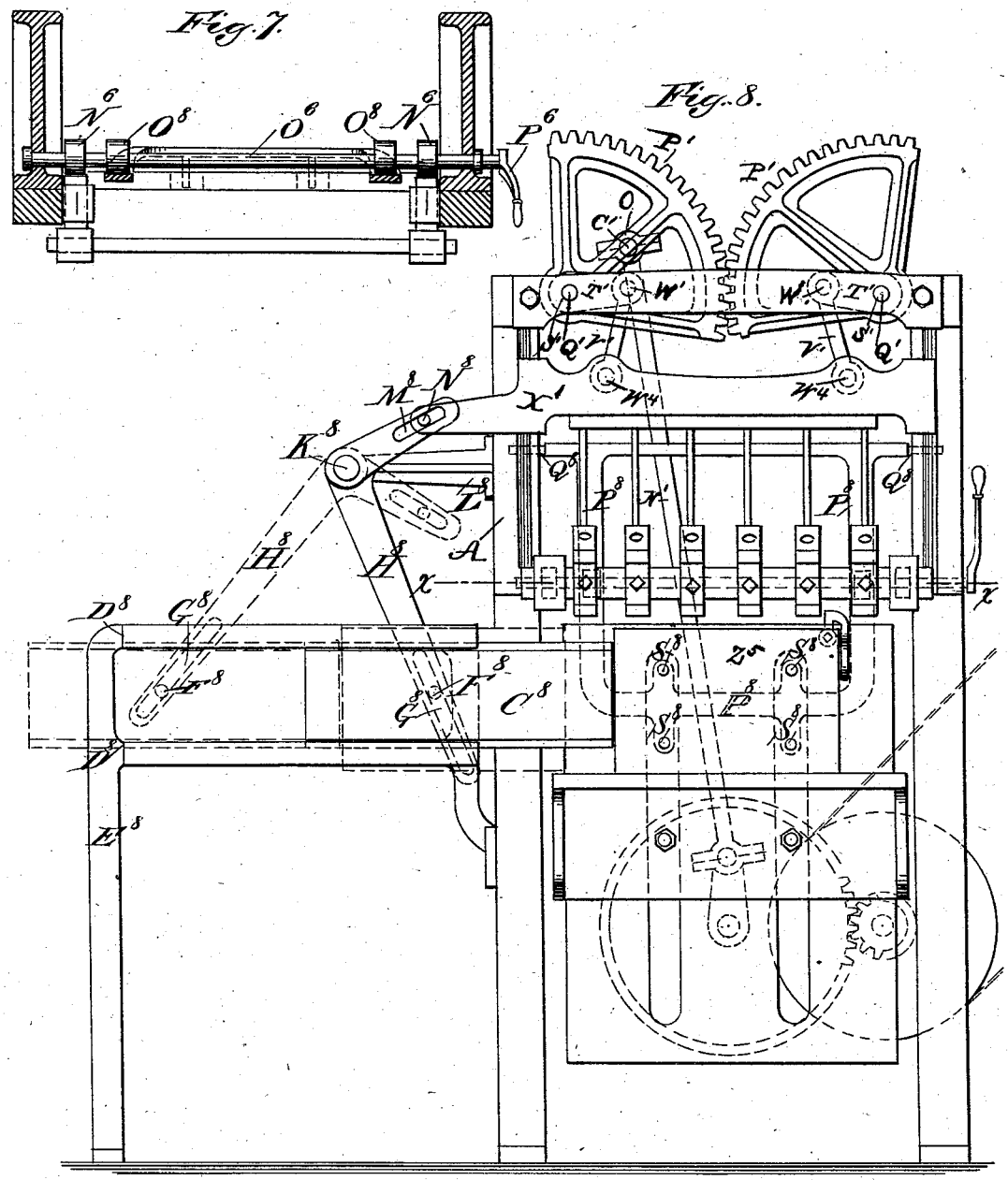
Witnesses
Henry F. Parker
J. C. Lathrop
Inventor:
Joseph H. Swift
J. C. Woodward,
Attorney

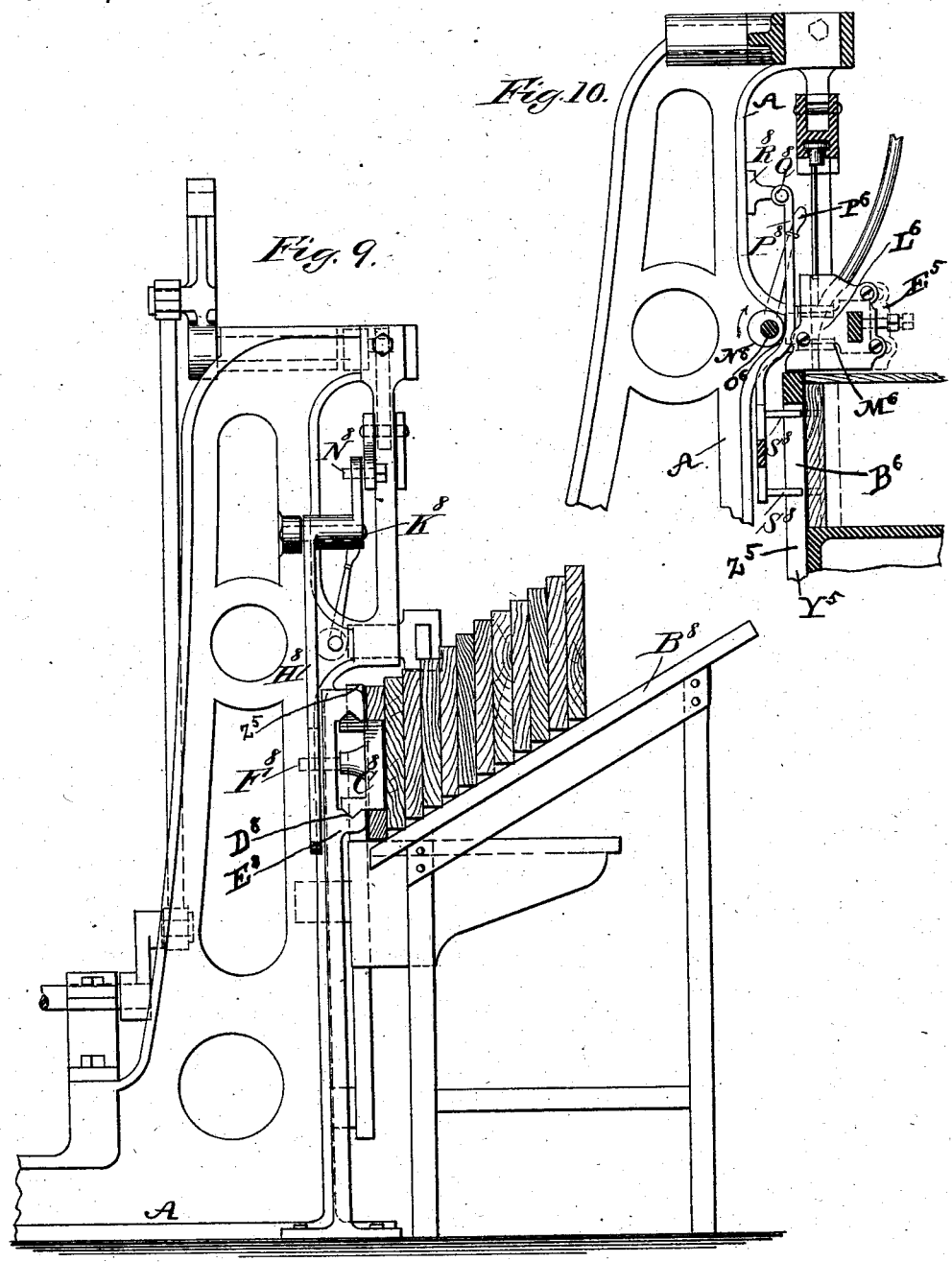

(No Model.)

7 Sheets—Sheet 7.

J. H. SWIFT.
BOX NAILING MACHINE.

No. 289,941. Patented Dec. 11, 1883.

Witnesses:
Wm H Bates
J. C. Lathrop

Inventor:
Joseph H. Swift,
T. C. Woodward,
Attorney.

UNITED STATES PATENT OFFICE.

JOSEPH H. SWIFT, OF BROOKLYN, NEW YORK.

BOX-NAILING MACHINE.

SPECIFICATION forming part of Letters Patent No. 289,941, dated December 11, 1883.

Application filed July 24, 1883. (No model.)

*To all whom it may concern:*

Be it known that I, JOSEPH H. SWIFT, of Brooklyn, New York, have invented certain new and useful Improvements in Box-Nailing Machines, set forth in this specification and the drawings thereof.

The invention consists in improvements relating to the construction of the nail-feeder and the nail-driver and intervening mechanism, and the combination of the same.

Figure 1:
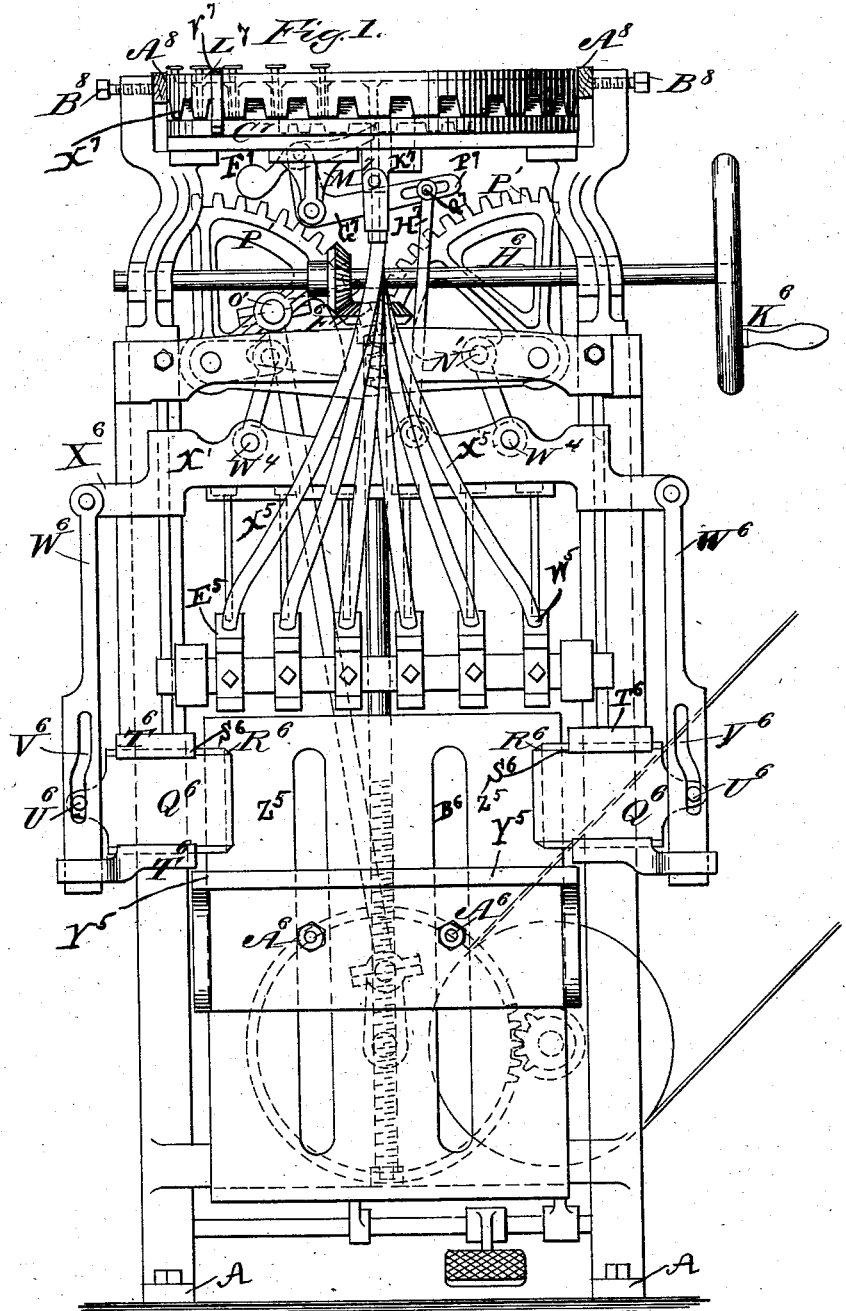
Figure 2:
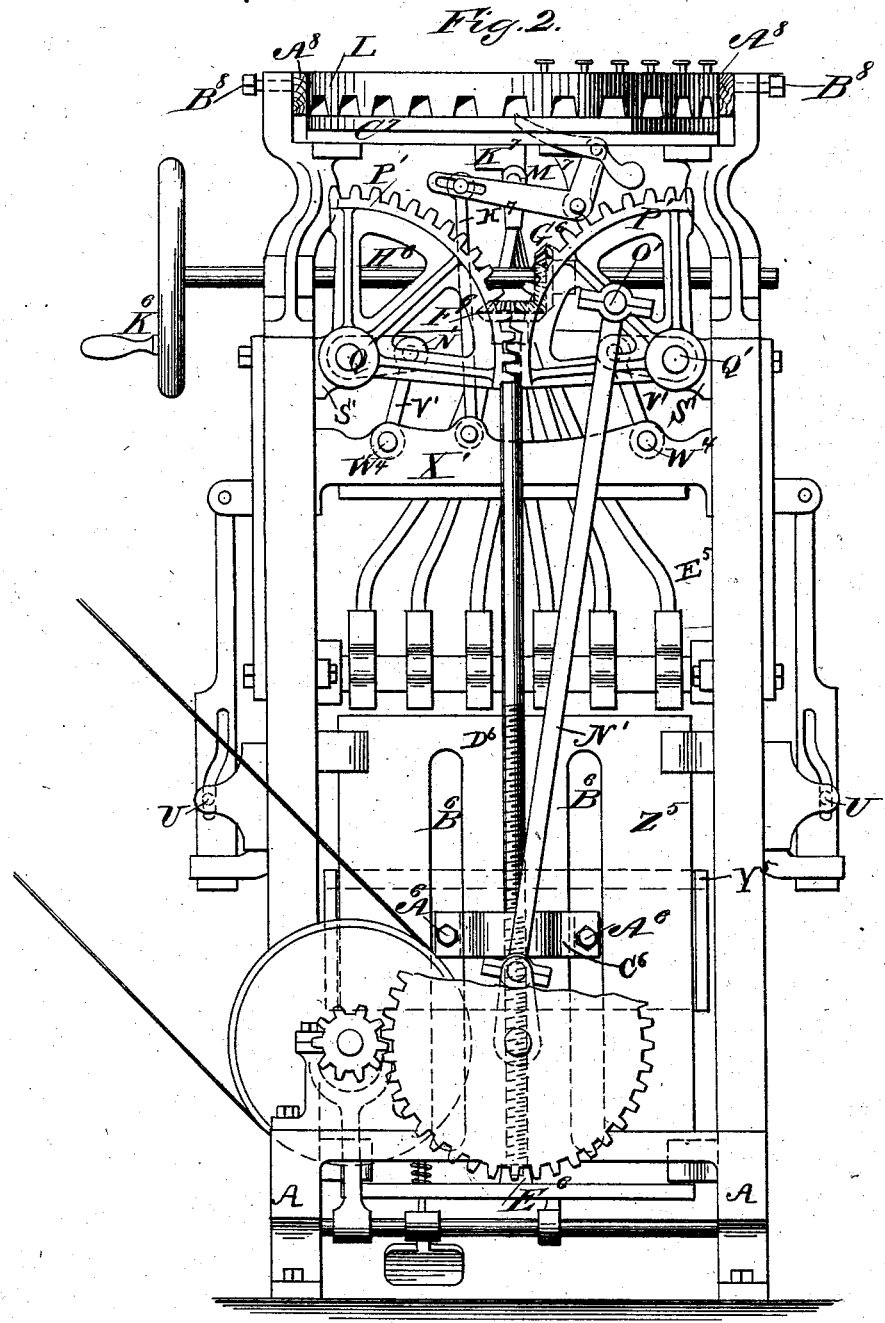

Figure 1 is a front view of the machine. Fig. 2 is a rear view thereof. Fig. 3 is a side view of the same. Figs. 4, 5, 6, 7, 8, 9, 10, and 11 are detail views of portions thereof.

Figure 11:
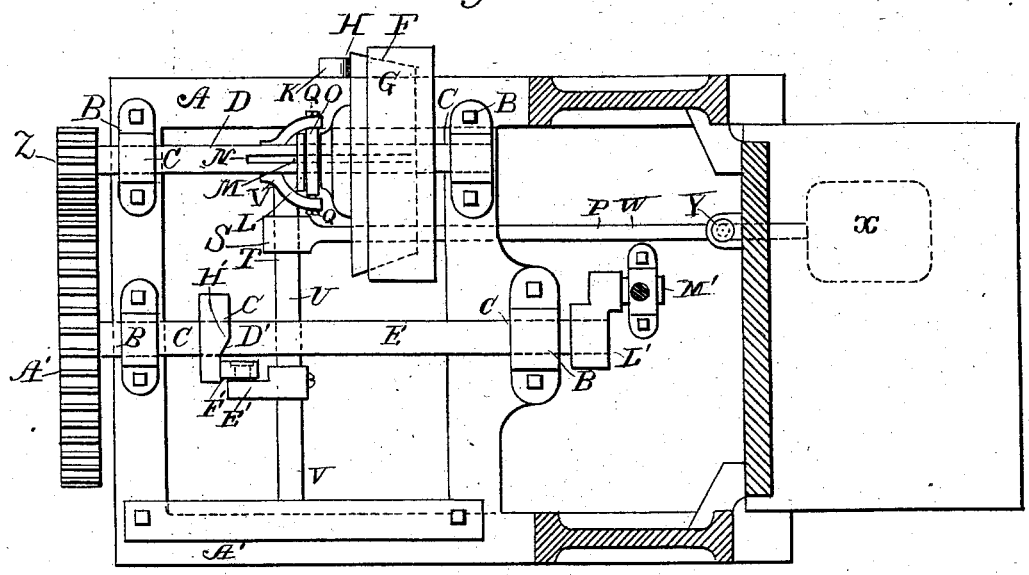

In the form of construction shown on the frame A, Fig. 11, are four bearings, B, in which are supported the journals C of the shafts D E.

On the shaft D is a driving-pulley, F, which is driven by a belt from suitable driving-power.
The driving-pulley F is loose on the shaft D, and has a conical recess, G, into which is fitted a conical friction-pulley, H. The friction-pulley H has a neck, K, with a flange, L, and is loose on the shaft D, but is held from turning thereon by a groove, M, and feather N. The friction-pulley H is operated back and forth on the shaft D into and out of the conical recess G, to fasten or unfasten the pulley F to or from the shaft D, by a collar, O, on the neck K and an elbow-lever, P. The collar O is pivoted by bolts Q between the forks R of the short arm S, Fig. 3, of the elbow-lever P, which has for its fulcrum T a rock-shaft, U, supported in bearings V in the frame A. The long arm W of the elbow-lever P has a foot-piece, X, and a retracting-spring, Y. By applying pressure to the foot-piece X when the pulley F is in motion, the friction-pulley H is forced into the conical recess G in the pulley F, and by friction is locked therein, and causes the shaft D to be driven. The pinion Z on the end of shaft D drives the cog-wheel A' on the end of shaft E and gives motion thereto.

On shaft E is a cam-wheel, C'. The cam-wheel C' has a cam, D', on its side.

On the shaft U is an arm, E', having at its upper end a roller, F', which rolls against the cam D' on the cam-wheel C'. The arm E' is adjustable by set-screw G'.

When the pressure is suddenly applied to the foot-piece X, the lever P depressed, the friction-pulley H engaged with the pulley F, and the shafts C D in motion, and the pressure suddenly removed from the foot-piece X, the roller F' operates against the cam D' on the side of the cam-wheel C' and holds the friction-pulley H engaged with the pulley F until one revolution of the cam-wheel C' is made, when the roller F' drops into a notch, H', at the end of the cam D' and releases the friction-pulley H from the pulley F, which is then drawn back by the retracting-spring Y against the friction-brake K' on the frame A, and the motion of shaft D is stopped. The brake K' is adjustable by set-screws in the frame A, and may press the edge or back of the friction-pulley H. As the motion of the shaft D is intermittent, depending as it does upon the operation of the elbow-lever P, the friction-pulley H, the roller F', and the cam D', so the motion of shaft E is also intermittent.

On the end of shaft E is a crank, L', which has a wrist-connection, M', with pitman N', Fig. 8, to which it imparts intermittent motion. Pitman N' is connected by a wrist, O', to the segments P', and imparts intermittent motion to them. The segments P' are fixed at their centers to the ends of short shafts Q', having bearing S' on the frame A, and cranks T' at their other ends.

To the wrists W' of cranks T' are connected short pitmen V', which are connected at their other ends by pivot-bolts W⁴ to the cross-head X', and impart intermittent motion to it from the segments. The cross-head X', Fig. 3, has V end grooves, Y', and is intermittently reciprocated in the frame A on V-ways Z'. Nail-punches A⁵, Fig. 4, have eccentric heads B⁵, and are slid into position and suspended in a T-groove, C⁵, in the lower edge of the cross-head X'. The nail-punches A⁵ enter channels D⁵ in nail-boxes E⁵, and are reciprocated with the cross-head X', but are not thereby withdrawn from the nail-channels D⁵, but remain connected with the nail-boxes E⁵. The nail-punches A⁵ may be of any desired number; but five are very convenient for ordinary use. The nail-boxes E⁵ have mortises F⁵, through which they are slid into position on a supporting-bar, G⁵, and held by set-screws H⁵, in connection with the nail-punches A⁵. The nail-boxes E⁵ are made in two parts, K⁵ L⁵, held together by set-screws at $M^5$. Each of the parts $K^5$ $L^5$ has a recess, $N^5$, into which is placed a slide or die, $O^5$, and compression-springs $P^5$. The slides or dies $O^5$ have slots $Q^5$, by which they are suspended on pins $R^5$ in one of the parts $K^5$. They also have counterpart nail-grooves $S^5$ of the form shown, which together form nail-guides $T^5$, to be closed or opened at the lower end, $W^5$. The compression-springs $P^5$ keep the slides or dies $O^5$ closed, and consequently the lower ends of the guides $T^5$ closed, until they are forced open by the descent of the nail-punches $A^5$. The parts $K^5$ $L^5$ have channels $V^5$, which form nail-grooves $U^5$, into which enter nail-tubes $X^5$, Fig. 3. The nails descend through the nail-tubes $X^5$ and the nail-grooves $U^5$ into the nail-grooves $S^5$, and onto the closed end $W^5$ thereof, and rest on their points until the nail-punches $A^5$ descend, strike the nails on their heads, and force open the slides or dies $O^5$, and drive the nails through the nail-boxes $E^5$ into the work to be nailed to form the boxes.

The work is placed on a table, $Y^5$, under the nail-boxes $E^5$, and against a back plate, $Z^5$. The table $Y^5$ and the back plate, $Z^5$, are both adjustable to suit the work. The table $Y^5$ is adjustable by arms $A^6$, Fig. 2, passing through slots $B^6$ in the back plate, $Z^5$, and connected with a block, $C^6$, through which passes an adjusting-screw, $D^6$, supported at its lower end in a socket, $E^6$, on the frame $A$, and having at its upper end a bevel-wheel, $F^6$, connecting with a bevel-wheel, $G^6$, on a shaft, $H^6$, having a hand-wheel, $K^6$, to operate the screw $D^6$ to raise or lower the table to suit the work under the nail-boxes $E^5$. The back plate, $Z^5$, is adjustable as the height of the pieces for the boxes against it may require. By slide-arms $L^6$, Fig. 10, in grooves $M^6$ in the frame A, in the inner ends of which are eccentrics $N^6$ on a shaft, $O^6$, having a hand-lever, $P^6$, to operate, the slide-arms are moved in or out the nail-boxes $E^5$ as the thicknesses of the pieces of the work to be placed against the back plate, $Z^5$, may require. The pieces of the work against the back plate, $Z^5$, Fig. 1, are held from bending or splitting by clamps $Q^6$, having V end grooves, $R^6$, to clamp the pieces. The clamps $Q^6$ slide in grooves $S^6$ on the frame A, formed by lugs or projections $T^6$, and are operated to hold and release the pieces of the work against the back plate, $Z^5$, by pins $U^6$ in cams $V^6$ in bars $W^6$, connected to projections $X^6$ on the cross-head $X'$, by which they are intermittently reciprocated.

To one side of and adjacent to the table $Y^5$ is an incline, $B^8$, Fig. 9, properly supported to receive the pieces of the work that are to go against the back plate, $Z^5$, and to permit them to slide forward by gravity. To slide these pieces endwise in front of the back plate, $Z^5$, Fig. 8, in position to be nailed, a slide, $C^8$, sliding in grooves $D^8$ in a supporting-frame, $E^8$, is intermittingly operated by a pin, $F^8$, and a slot, $G^8$, in an elbow-lever, $H^8$, pivoted at $K^8$ to a projection, $L^8$, on the frame A, and intermittingly operated by a slot, $M^8$, and a pin, $N^8$, from the cross-head $X'$.

On the shaft $O^6$, Fig. 7, are eccentrics $O^8$, operating against swinging rods $P^8$, Fig. 10, pivoted at $Q^8$ to projections $R^8$ on the frame A, and having at their lower ends pins $S^8$, passing through the slots $B^6$ in the back plate, $Z^5$, to bear against the pieces of the work that are in front of the back plate, $Z^5$, and limit their position with respect to the other pieces of the work to be nailed to them, so as to permit, for example, the end pieces of boxes to stand in a little from the ends of the side pieces, to afford protection to prints or labels on the ends of the boxes.

To the frame A is fastened an annular plate, $C^7$, Figs. 1 and 6. Across the under side of the annular plate, $C^7$, and fastened to it, is a bar, $D^7$, to which is pivoted centrally at $N^7$ a perforated plate, $L^7$, having on its under side, above the bar $D^7$, a ratchet, $E^7$, in which operates a weighted pawl, $F^7$, to revolve the perforated plate $L^7$. The pawl is operated by an elbow-lever, $G^7$, pivoted to a bracket, $M^7$, as a fulcrum to the pawl $F^7$, and the long arm $P^7$ is slotted to receive the wrist-pin $Q^7$ of the pitman $H^7$, which is connected to the cross-head $X'$, from which intermittent motion is imparted to the perforated plate $L^7$.

On the lower side of the annular plate $C^7$ is a nail-receiver, $K^7$—a receptacle into which the nails drop from the perforations $T^7$ in the perforated plate $L^7$ through an opening in the annular plate $C^7$, and from which nail-tubes $X^5$ lead to the nail-guides $T^5$ in the nail-boxes $E^5$.

To prevent the pawl $F^7$ from raising the edge of the perforated plate $L^7$, clips $V^7$ may extend from the annular plate $C^7$ over the edge of the perforated plate $L^7$ or into a groove in the edge of it. The perforated plate $L^7$ should be perforated at regular intervals adapted to the ratchet, and in rows adapted to the number of nail-punches to be used at one time in nailing the work. The nails should be placed in the perforations $T^7$ in the perforated plate $L^7$, by hand, point foremost. As the perforated plate $L^7$ revolves, the rows of nails will be dropped into the nail-receiver $K^7$ and into the tubes $X^5$, and be conducted to the nail-guides $T^5$ in the nail-boxes $E^5$ in the proper position to be driven. The perforated plate $L^7$ has projections $X^7$ on its lower side, to give depth enough to the perforations $T^7$ to hold the nails in a vertical position. The perforated plate $L^7$ has a basin, $Y^7$, to fit into the opening $Z^7$ in the annular plate $C^7$, and the ratchet $E^7$ is on the bottom of the basin $Y^7$, which serves as a receptacle for the nails in bulk. The annular plate $C^7$ has an opening, $W^7$, in front or rear of the nail-receiver $K^7$, for the escape of misplaced nails. The perforated plate $L^7$ is regulated in its movements by friction-brakes $A^8$, adjustable and held to the frame A by set-screws $B^8$.

The operating and starting and stopping mechanism, as described, and circular revolving nail-feeders and nail-drivers, in their general features, as specified, are well known, and I make no claim to them, broadly.

The details of construction and operation may be varied within the scope of the improvements.

I claim as my invention—

1. The combination, in nail-driving mechanism, of transversely-adjustable nail-drivers, nail-boxes, a transversely-adjustable supporting-bar, and cams on a rock-shaft to move the supporting-bar and the nail-boxes thereon backward or forward to suit different work, substantially as set forth.

2. The combination, in nail-driving mechanism, of transversely-adjustable nail-boxes and nail-drivers, pendent arms projecting through the back plate, and a rock-shaft having cams against the pendent arms, in the rear thereof, to move them forward or backward together independently of the nail-boxes and nail-drivers to limit the position of portions of the work, substantially as set forth.

3. The combination, in nail-driving mechanism, of the clamps, having beveled ends at each end of and in front of the back plate, and cam-bars connected to the cross-head and adapted to slide the clamps toward and from each other by the reciprocation of the cross-head, substantially as set forth.

4. The combination, in nail-driving mechanism, of the reciprocating cross-head, an inclined table, a reciprocating slide in front of the back plate, and an elbow-lever to operate the slide from the cross-head to push portions of the work from the table under the nail-boxes, substantially as set forth.

5. The combination, in nail-driving mechanism, of a nail-driver having an eccentrically-mounted head and adjustable nail-boxes to adapt the nail-drivers to the adjustment of the nail-boxes, substantially as set forth.

6. The combination, in nail-driving mechanism, of a revolving perforated plate having a nail-basin in the center and a ratchet on the bottom, an annular fixed plate having a nail-receiver and a nail-escape, a pawl, elbow-lever, and pitman to operate the perforated plate from the cross-head, and nail-tubes leading from the nail-receiver to the nail-boxes, whereby nails placed by hand in the perforations are fed singly into position under the nail-punchers, substantially as set forth.

7. The combination, in nail-driving mechanism, of a revolving perforated plate having a ratchet on the bottom, an annular fixed plate having a nail-receiver and a nail-escape, nail-tubes from the nail-receiver to the nail-boxes, and a pawl, elbow-lever, and pitman to operate the perforated plate from the reciprocated cross-head, whereby nails are fed intermittently and separately into the nail-boxes under the nail-drivers, substantially as set forth.

8. The combination, in nail-driving mechanism, of a revolving plate having a ratchet on the bottom and perforations for the nails, a fixed annular plate thereunder, having nail-passages, friction-pads adapted to bear against and regulate the movement of the revolving plate, nail-tubes leading to the nail-boxes, a pawl, and operating mechanism to intermittently move the revolving plate from the cross-head, whereby nails placed in the perforations are fed into position to be driven, substantially as set forth.

In testimony whereof I hereunto subscribe my signature and affix my seal, in the presence of two witnesses, in the city, county, and State of New York, the 27th day of March, 1883.

JOSEPH H. SWIFT. [L. S.]

Witnesses:
M. PARPART,
O. E. FIGGE.